Feb. 25, 1958  G. KLEMT  2,824,493
OPTICAL SYSTEM HAVING INTERCHANGEABLE ELEMENTS
FOR VARYING ITS FOCAL LENGTH
Filed June 22, 1954
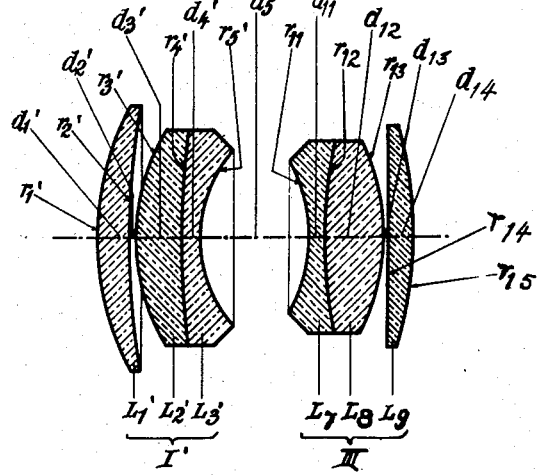
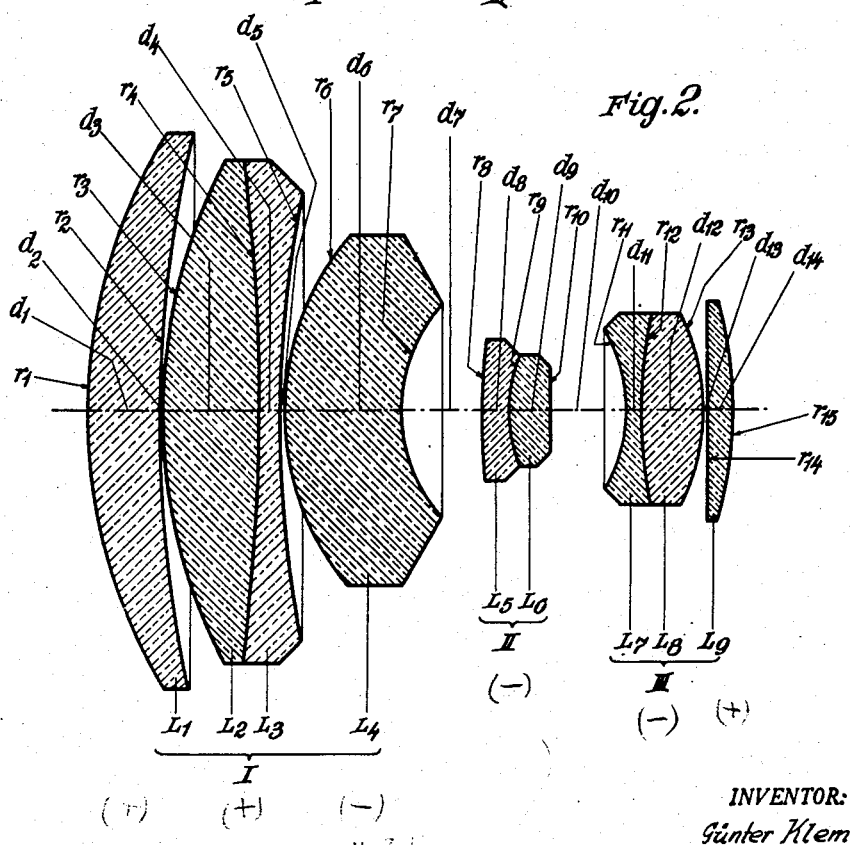
INVENTOR:
Günter Klemt
BY
Karl F. Ross
AGENT

United States Patent Office 2,824,493
Patented Feb. 25, 1958

2,824,493

OPTICAL SYSTEM HAVING INTERCHANGEABLE ELEMENTS FOR VARYING ITS FOCAL LENGTH

Günter Klemt, Kreuznach, Rhineland, Germany, assignor to Jos. Schneider & Co., Kreuznach, Rhineland, Germany Application June 22, 1954, Serial No. 438,511

Claims priority, application Germany June 27, 1953

6 Claims. (Cl. 88—57)

It has already been proposed to bring about changes in the focal length of a photographic objective (and, thereby, in the scale of the projected image), without substantially varying its effective image distance, by interchanging a detachable objective portion on the object side co-operating with a fixed objective portion.

The practical realization of this idea has heretofore run into obstacles of both a purely optical and an optico-mechanical nature. The last-mentioned obstacles arise from the difficulty of properly positioning the detachable front portion of an exchange objective with respect to the fixed rear portion common to both the exchange and the principal or normal-view objective; means for overcoming this difficulty have been disclosed in co-pending applications Ser. No. 402,679, filed January 7, 1954, by myself, and Ser. No. 431,506, filed May 21, 1954, by Paul Härter et al., both owned by the assignee of the present application.

The other class of obstacles arises, as pointed out in my co-pending application Ser. No. 438,174, filed June 21, 1954, now Patent No. 2,796,002, from the difficulty of so calculating the components of both the fixed rear objective portion and the two or more detachable objective portions that the combination of this rear portion with either or each of the associated front portions will result in sharp image definition and satisfactory suppression of residual aberrations. The general object of my present invention is the elimination of this latter difficulty with particular reference to exchange objectives whose focal length is greater than that of the principal or normal-view objective, thus to exchange objectives of the telephoto type. A more specific object of this invention is to provide an improved exchange objective of the aforementioned character whose fixed rear portion is one of the halves of a Gaussian dual objective and whose detachable front portion is adapted to replace the other half of such dual objective, the usual diaphragm space being enclosed between these two portions.

A feature of this invention resides in the provision of an objective portion adapted to replace the front half of a Gaussian dual objective of a type which comprises a pair of collective outer lenses between which there are enclosed a pair of dispersive menisci facing the diaphragm space and composed each of a positive and a negative lens cemented together, this objective portion including the following two members: (a) a positively refracting front unit comprising three air-spaced members each in the form of a meniscus facing the diaphragm space with its concave side; and (b) a rear unit comprising a single, compound lens member of negative refracting power, the latter being separated from the front unit by an air space which is large compared with the spacings of the three members of the front unit.

A more specific feature of this invention resides in constructing one of the positive members of the front unit of the exchange objective portion, preferably the intermediate member of that unit, as a compound lens across whose cemented surface there occurs (proceeding from the object side to the image side) a marked increase in the refractive index coupled with a marked decrease in the Abbé number $\nu_d$, and by providing a marked decreased in the refractive index across the cemented surface of the compound lens member constituting the rear unit of the exchange portion. The increase in the refractive index of the first-mentioned compound lens should be of the order of or greater than 0.1, the decrease in the refractive index of the second compound lens being of the order of or greater than 0.05; the decrease in the Abbé number of the first compound lens should be of the order of or greater than 30.

The invention will be further described with reference to the accompanying drawing in which:

Fig. 1 schematically illustrates the front and rear halves of a fundamental optical system, of predetermined focal length, in the form of a Gaussian dual objective; and Fig. 2 illustrates an exchange objective, of increased focal length, obtained by substituting a group of lens members according to the invention for the front half of the objetcive of Fig. 1.

The Gaussian objective of Fig. 1 comprises a front half I' detachably secured to a rear half III by means not shown (e. g. in the manner disclosed in either of the two first-mentioned co-pending applications). Front half I' consists of a positive, slightly meniscus-shaped lens member $L_1'$ whose radii are $r_1'$, $r_2'$ and whose thickness is $d_1'$, followed by a compound negative meniscus member composed of lenses $L_2'$ (radii $r_3'$, $r_4'$ and thickness $d_3'$) and lens $L_3'$ (radii $r_4'$, $r_5'$ and thickness $d_4'$), the spacing between the two members being designated $d_2'$. Rear half III consists of a compound negative meniscus member composed of lenses $L_7$ (radii $r_{11}$, $r_{12}$ and thickness $d_{11}$) and $L_8$ (radii $r_{12}$, $r_{13}$ and thickness $d_{12}$) followed by a positive lens member $L_9$ (radii $r_{13}$, $r_{14}$ and thickness $d_{14}$), the spacing between the two last-mentioned members being designated $d_{13}$. The relatively large distance $d_5'$ between objective portions I' and III defines a diaphragm space adapted to receive the usual iris diaphragm and shutter (not shown).

With an aperture ratio of 1:2, an overall focal length given the numerical value of 100 and an image distance (the spacing between the last lens $L_9$ and the surface of projection) equal to 72.4, the radii, thicknesses and spacings of the elements of the system may be as given in the following Table A, the latter being identical with the corresponding table of my co-pending application Ser. No. 438,174, now Patent No. 2,796,002.

Table A

|  |  |  |  | $n_d$ | $\nu_d$ |
|---|---|---|---|---|---|
| I' | $L_1$ | $r_1'=+54.83$ | $d_1'=6.71$ | 1.67003 | 47.2 |
|  |  | $r_2'=+156.25$ | $d_2'=1.27$ | (Air space) |  |
|  | $L_2$ | $r_3'=+39.67$ | $d_3'=8.93$ | 1.69347 | 53.5 |
|  |  | $r_4'=+168.32$ |  |  |  |
|  | $L_3$ |  | $d_4'=3.52$ | 1.66446 | 35.9 |
|  |  | $r_5'=+25.89$ | $d_5'=21.21$ | (Diaphragm space) |  |
| III | $L_7$ | $r_{11}=-30.20$ | $d_{11}=3.17$ | 1.63980 | 34.6 |
|  |  | $r_{12}=+90.18$ |  |  |  |
|  | $L_8$ |  | $d_{12}=11.88$ | 1.65844 | 50.8 |
|  |  | $r_{13}=-41.87$ | $d_{13}=0.21$ | (Air space) |  |
|  | $L_9$ | $r_{14}=+2359.37$ | $d_{14}=5.25$ | 1.74472 | 44.7 |
|  |  | $r_{15}=-77.24$ |  |  |  |

In the exchange objective of Fig. 2 the lens group I' of Fig. 1 has been replaced by an assembly including two units I and II. Forward unit I is composed of three menisci all facing the diaphragm space with their concave sides, including a simple, positively refracting front lens $L_1$ (radii $r_1$, $r_2$ and thickness $d_1$), a compound, positive intermediate member composed of cemented lenses $L_2$ (radii $r_3$, $r_4$ and thickness $d_3$) and $L_3$ (radii $r_4$, $r_5$ and thickness $d_4$) and a simple rear lens $L_4$ (radii $r_6$, $r_7$ and thickness $d_6$); the air spaces between the three menisci of this unit have been designated $d_2$ and $d_5$. Rear unit II consists of a negatively refracting compound member composed of cemented lenses $L_5$ (radii $r_8$, $r_9$ and thickness $d_8$) and $L_6$ (radii $r_9$, $r_{10}$ and thickness $d_9$). The air space $d_7$ between units I and II may be variable and is large compared with the air spaces $d_2$ and $d_5$ of the front unit, being for instance roughly equal to or greater than the diaphragm space $d_{10}$.

In the following Table B I have given illustrative values for the radii, thicknesses and air spaces of the exchange portion of an optical system as shown in Fig. 2, having an aperture ratio of 1:4.5, a focal length of 161.7 and an image distance of 72.2; the parameters of unit III are the same as in Table A:

Table B

| | | | $n_d$ | $\nu_d$ |
|---|---|---|---|---|
| I | $L_1$ | $r_1=+105.43$ $r_2=+336.81$ | $d_1=14.08$ | 1.62041 | 60.3 |
| | | | $d_2=0.21$ | (Air space) | |
| | $L_2$ | $r_3=+107.61$ $r_4=-374.06$ | $d_3=19.06$ | 1.62041 | 60.3 |
| | $L_3$ | $r_5=+262.27$ | $d_4=4.22$ | 1.76182 | 26.5 |
| | | | $d_5=0.21$ | (Air space) | |
| | $L_4$ | $r_6=+52.10$ $r_7=+31.02$ | $d_6=23.00$ | 1.62041 | 60.3 |
| | | | $d_7=15.83$ | (Air space) | |
| II | $L_5$ | $r_8=+131.98$ $r_9=+28.47$ | $d_8=4.81$ | 1.69347 | 53.5 |
| | $L_6$ | $r_{10}=+125.71$ | $d_9=7.70$ | 1.53172 | 48.9 |
| | | | $d_{10}=14.77$ | (Diaphragm space) | |

In a modification, a somewhat more powerful optical system in accordance with Fig. 2 may have an aperture ratio of 1:4.0, a focal length of 161.5 and an image distance of 72.2 with radii, thicknesses and air spaces as given in the following Table C, the parameters of unit III being again the same as in Table A:

Table C

| | | | $n_d$ | $\nu_d$ |
|---|---|---|---|---|
| I | $L_1$ | $r_1=+99.72$ $r_2=+462.93$ | $d_1=16.67$ | 1.62041 | 60.3 |
| | | | $d_2=0.21$ | (Air space) | |
| | $L_2$ | $r_3=+115.65$ $r_4=-677.58$ | $d_3=17.11$ | 1.62041 | 60.3 |
| | $L_3$ | $r_5=+185.21$ | $d_4=4.22$ | 1.76182 | 26.5 |
| | | | $d_5=0.21$ | (Air space) | |
| | $L_4$ | $r_6=+49.50$ $r_7=+33.42$ | $d_6=19.45$ | 1.62041 | 60.3 |
| | | | $d_7=21.10$ | (Air space) | |
| II | $L_5$ | $r_8=+142.53$ $r_9=+26.48$ | $d_8=4.39$ | 1.69347 | 53.5 |
| | $L_6$ | $r_{10}=+119.34$ | $d_9=7.07$ | 1.54869 | 45.4 |
| | | | $d_{10}=14.77$ | (Diaphragm space) | |

In the foregoing examples, it will be noted, there exists across the cemented surface $r_4$ of intermediate meniscus $L_2$, $L_3$ an increase in the refractive index exceeding 0.1, whereas a decrease of similar magnitude exists across the cemented surface $r_9$ of unit II; the latter decrease is thus in excess of the aforestated minimum of 0.05. Also, a decrease in the Abbé number by more than 30 occurs at the cemented surface $r_4$.

I claim:
1. A lens assembly adapted to replace the front half of a Gaussian dual objective whose front and rear halves define between them a diaphragm space, each of said halves comprising a dispersive meniscus adjacent said diaphragm space and facing same with its concave side as well as a positive lens beyond said meniscus; said assembly comprising a positively refracting front unit including three air-spaced members each in the form of a meniscus facing said diaphragm space with its concave side, and a rear unit comprising a compound lens member of negative refracting power, said units being separated from each other by an air space which is large compared with all other air spaces of said lens assembly, said units being so dimensioned as to increase the focal length of the objective without substantial change in image distance [upon being substituted] for said front half, the intermediate one of said three air-spaced members being a compound positive meniscus constituting a first pair of front and rear lens elements and said compound lens member of said rear unit constituting a second pair of front and rear lens elements, the rear element of said first pair having a refractive index exceeding that of the front element of said first pair by a value at least of the order 0.1, the front element of said second pair having a refractive index exceeding that of the rear element of said second pair by a value at least of the order of 0.05, the front element of said first pair having an Abbé number exceeding that of the rear element of said first pair by a value at least of the order of 30.

2. In an optical system, in combination, a front assembly and a rear assembly detachable from each other and defining between them a diaphragm space, said rear assembly comprising a dispersive meniscus adjacent said diaphragm space and facing same with its concave side as well as a positive lens back of said meniscus; said front assembly comprising a positively refracting, front unit including three air-spaced members each in the form of a meniscus facing said diaphragm space with its concave side, and rear unit comprising a single compound lens member of negative refracting power, said units being separated from each other by an air space which is large compared with all other air spaces of said system except said diaphragm space, said rear assembly being adapted to co-operate with a substantially mirror-symmetrical lens assembly to form a Gaussian dual objective of predetermined focal length and image distance, said front and rear assemblies together having an image distance substantially equal to and an overall focal length considerably greater than that of said Gaussian dual objective, the intermediate one of said three air-spaced members being a compound meniscus constituting a first pair of front and rear lens elements and said compound lens member of said rear unit constituting a second pair of front and rear lens elements; the rear element of said first pair having a refractive index exceeding that of the front element of said first pair by a value at least of the order of 0.1, the front element of said second pair having a refractive index exceeding that of the rear element of said second pair by a value at least of the order of 0.05, the front element of said first pair having an Abbé number exceeding that of the rear element of said first pair by a value at least of the order of 30.

3. The combination according to claim 2, wherein said air space between said front and rear units is at least of the same order of magnitude as said diaphragm space.

4. The combination according to claim 2, wherein said air space between said front and rear units is variable.

5. The combination according to claim 2, wherein the radii $r_1$, $r_2$ and thickness $d_1$ of the first member $L_1$ of said three air-spaced members, the air space $d_2$ between the first and the second of said three air-spaced members, the radii $r_3$, $r_4$ and thickness $d_3$ of the front element $L_2$ of the second one of said three air-spaced members, the radii $r_4$, $r_5$ and thickness $d_4$ of the rear element $L_3$ of said second one of said three air-spaced members, the air space $d_5$ between the second and the third of said three air-spaced members, the radii $r_6$, $r_7$ and thickness $d_6$ of the third member $L_4$ of said three air-spaced members, the air space $d_7$ between said front and rear units, the radii $r_8$, $r_9$ and thickness $d_8$ of the front element $L_5$ of said rear unit, the radii $r_9$, $r_{10}$ and thickness $d_9$ of the rear element $L_6$ of said rear unit, the diaphragm space $d_{10}$, the radii $r_{11}$, $r_{12}$ and thickness $d_{11}$ of a front element $L_7$ of said dispersive meniscus of said rear unit, the radii $r_{12}$, $r_{13}$ and thickness $d_{12}$ of a rear element $L_8$ of the last-mentioned meniscus, the air space $d_{13}$ between said last-mentioned meniscus and said positive lens $L_9$ of said rear unit, the radii $r_{14}$, $r_{15}$ and thickness $d_{14}$ of said positive lens $L_9$ of said rear unit, the refractive indices $n_d$ of all the components $L_1$ . . . $L_9$ of said front and rear assemblies, and the Abbé number $v_d$ of all of said components being substantially as given in the following table, said front and rear assemblies together defining an exchange objective having an overall focal length of 161.7 and an image distance of substantially 72.2, all based upon a numerical value of 100 for the overall focal length of said Gaussian dual objective:

|  |  |  | $n_d$ | $v_d$ |
|---|---|---|---|---|
| $L_1$ | $r_1=+105.43$ | $d_1=14.08$ | 1.62041 | 60.3 |
|  | $r_2=+336.81$ | $d_2=0.21$ | (Air space) |  |
| $L_2$ | $r_3=+107.61$ | $d_3=19.06$ | 1.62041 | 60.3 |
| $L_3$ | $r_4=-374.06$ | $d_4=4.22$ | 1.76182 | 26.5 |
|  | $r_5=+262.27$ | $d_5=0.21$ | (Air space) |  |
| $L_4$ | $r_6=+52.10$ | $d_6=23.00$ | 1.62041 | 60.3 |
|  | $r_7=+31.02$ | $d_7=15.83$ | (Air space) |  |
| $L_5$ | $r_8=+131.98$ | $d_8=4.81$ | 1.69347 | 53.5 |
| $L_6$ | $r_9=+28.47$ | $d_9=7.70$ | 1.53172 | 48.9 |
|  | $r_{10}=+125.71$ | $d_{10}=14.77$ | (Diaphragm space) |  |
| $L_7$ | $r_{11}=-30.20$ | $d_{11}=3.17$ | 1.63980 | 34.6 |
| $L_8$ | $r_{12}=+90.18$ | $d_{12}=11.88$ | 1.65844 | 50.8 |
|  | $r_{13}=-41.87$ | $d_{13}=0.21$ | (Air space) |  |
| $L_9$ | $r_{14}=+2359.37$ | $d_{14}=5.25$ | 1.74472 | 44.7 |
|  | $r_{15}=-77.24$ |  |  |  |

6. The combination according to claim 2, wherein the radii $r_1$, $r_2$ and thickness $d_1$ of the first member $L_1$ of said three air-spaced members, the air space $d_2$ between the first and the second of said three air-spaced members, the radii $r_3$, $r_4$ and thickness $d_3$ of the front element $L_2$ of the second one of said three air-spaced members, the radii $r_4$, $r_5$ and thickness $d_4$ of the rear element $L_3$ of said second one of said three air-spaced members, the air space $d_5$ between the second and the third of said three air-spaced members, the radii $r_6$, $r_7$ and thickness $d_6$ of the third member $L_4$ of said three air-spaced members, the air space $d_7$ between said front and rear units, the radii $r_8$, $r_9$ and thickness $d_8$ of the front element $L_5$ of said rear unit, the radii $r_9$, $r_{10}$ and thickness $d_9$ of the rear element $L_6$ of said rear unit, the diaphragm space $d_{10}$, the radii $r_{11}$, $r_{12}$ and thickness $d_{11}$ of a front element $L_7$ of said dispersive meniscus of said rear unit, the radii $r_{12}$, $r_{13}$ and thickness $d_{12}$ of a rear element $L_8$ of the last-mentioned meniscus, the air space $d_{13}$ between said last-mentioned meniscus and said positive lens $L_9$ of said rear unit, the radii $r_{14}$, $r_{15}$ and thickness $d_{14}$ of said positive lens $L_9$ of said rear unit, the refractive indices $n_d$ of all the components $L_1$ . . . $L_9$ of said front and rear assemblies, and the Abbé number $v_d$ of all of said components being substantially as given in the following table, said front and rear assemblies together defining an exchange objective having an overall focal length of 161.5 and an image distance of substantially 72.2, all based upon a numerical value of 100 for the overall focal length of said Gaussian dual objective:

|  |  |  | $n_d$ | $v_d$ |
|---|---|---|---|---|
| $L_1$ | $r_1=+99.72$ | $d_1=16.67$ | 1.62041 | 60.3 |
|  | $r_2=+462.93$ | $d_2=0.21$ | (Air space) |  |
| $L_2$ | $r_3=+115.65$ | $d_3=17.11$ | 1.62041 | 60.3 |
| $L_3$ | $r_4=-677.58$ | $d_4=4.22$ | 1.76182 | 26.5 |
|  | $r_5=+185.21$ | $d_5=0.21$ | (Air space) |  |
| $L_4$ | $r_6=+49.50$ | $d_6=19.45$ | 1.62041 | 60.3 |
|  | $r_7=+33.42$ | $d_7=21.10$ | (Air space) |  |
| $L_5$ | $r_8=+142.53$ | $d_8=4.39$ | 1.69347 | 53.5 |
| $L_6$ | $r_9=+26.48$ | $d_9=7.07$ | 1.54869 | 45.4 |
|  | $r_{10}=+119.34$ | $d_{10}=14.77$ | (Diaphragm space) |  |
| $L_7$ | $r_{11}=-30.20$ | $d_{11}=3.17$ | 1.63980 | 34.6 |
| $L_8$ | $r_{12}=+90.18$ | $d_{12}=11.88$ | 1.65844 | 50.8 |
|  | $r_{13}=-41.87$ | $d_{13}=0.21$ | (Air space) |  |
| $L_9$ | $r_{14}=+2359.37$ | $d_{14}=5.25$ | 1.74472 | 44.7 |
|  | $r_{15}=-77.24$ |  |  |  |

References Cited in the file of this patent

UNITED STATES PATENTS

| 461,609 | Gundlach | Oct. 20, 1891 |
| 583,336 | Rudolph | May 25, 1897 |
| 660,202 | Rudolph | Oct. 23, 1900 |
| 756,779 | Dallmeyer | Apr. 5, 1904 |
| 1,651,493 | Warmisham | Dec. 6, 1927 |
| 2,117,252 | Lee | May 10, 1938 |
| 2,169,130 | Tronnier et al. | Aug. 8, 1939 |
| 2,184,018 | Ort | Dec. 19, 1939 |
| 2,366,597 | Cox | Jan. 2, 1945 |
| 2,387,497 | Cox | Oct. 23, 1945 |
| 2,433,438 | Cox | Dec. 30, 1947 |